US005720362A

United States Patent [19]

Denkins

[11] Patent Number: 5,720,362

[45] Date of Patent: Feb. 24, 1998

[54] PORTABLE ADJUSTABLE WORK TRESTLE

[76] Inventor: Jeff L. Denkins, W1952 County S, Kaukauna, Wis. 54130

[21] Appl. No.: 519,395

[22] Filed: Aug. 25, 1995

[51] Int. Cl.$^6$ .......... F16M 11/00

[52] U.S. Cl. .......... 182/184; 182/186; 182/226

[58] Field of Search .......... 182/153, 155, 182/181, 186, 224–227, 172; 248/354–5, 188.5

[56] References Cited

U.S. PATENT DOCUMENTS

| | | | |
|---|---|---|---|
| 604,979 | 5/1898 | Garrett | 187/184 X |
| 2,324,196 | 7/1943 | Crozier | 182/186 X |
| 3,055,453 | 9/1962 | Vanyo | 182/186 |
| 4,289,215 | 9/1981 | Robinson | 182/184 |

FOREIGN PATENT DOCUMENTS

| | | | |
|---|---|---|---|
| 21492 | 3/1910 | Norway | 182/183 |

*Primary Examiner*—Alvin C. Chin-Shue
*Attorney, Agent, or Firm*—Andrus, Sceales, Starke & Sawall

[57] ABSTRACT

A portable, adjustable work trestle for use in the construction trades. The trestle is light weight and collapsible. The trestle comprises a foldable base structure with an elongated ladder-type configuration. The base structure has a predetermined height and includes four legs connected via step pads, board locks, board braces, and folding locks. A work surface board is disposed at the top or apex area of the trestle between the board locks. Four leg extensions are cooperatively and extensibly adjustably connected to the legs. The leg extensions enable the user to level and/or increase the height of the base structure. Optional second leg extensions may be added to further increase the height of the work surface provided by the trestle.

8 Claims, 8 Drawing Sheets

PORTABLE ADJUSTABLE WORK TRESTLE

BACKGROUND OF THE INVENTION

1. Field of the Invention

This invention relates generally to ladders, scaffolding and the like, and more particularly to a trestle for use in the construction trades. The trestle of this invention is lightweight, portable, adjustable, collapsible, and is particularly well suited for use by workers installing and finishing drywall.

2. Background Information

In the past, various devices and/or methods have been used as platforms for workers in the construction trades. However, these devices and methods have significant limitations and shortcomings.

Despite the need in the art for a trestle which overcomes the disadvantages, shortcomings and limitations of the prior art, none insofar as is known has been developed or proposed.

Accordingly, it is an object of the present invention to provide an improved trestle for workers in the construction and other trades. It is a further object of this invention to provide an trestle which is lightweight, portable, collapsible and adjustable, and which overcomes the limitations and shortcomings of the prior art.

SUMMARY OF THE INVENTION

In a basic aspect, the apparatus of the present invention provides a platform apparatus comprising:

(a) a base structure having a top platform and a plurality of upper leg members connected to and extending downwardly from the platform, each upper leg member having a predetermined length with a top and a bottom end, and an interior cavity which is open at the bottom end; and (b) at least one lower leg member connected to and telescopingly disposed in the bottom end of each the upper leg member.

In a preferred embodiment, the invention provides a lightweight, portable, adjustable, collapsible work trestle for use in the construction trades, comprising:

(a) a base structure having a top platform and first through fourth upper leg members connected to and extending downwardly from the platform, each upper leg member having a predetermined length with a top and a bottom end, and an interior cavity which is open at the bottom end, the top platform having a predetermined length and width, with two sides and two ends, the first and second upper leg members being disposed at opposing ends of the platform and extending downwardly and away from a first side of the platform at a predetermined angle, and third and fourth upper leg members being disposed at opposing ends and extending downwardly and away from a second side of the platform at the predetermined angle;

(b) at least one step member connected to the first and second upper leg members, and disposed below the top surface;

(c) means, disposed at the top ends of the upper leg members, to releasibly couple the top platform to the upper leg members;

(d) at least one lower leg member connected to and telescopingly disposed in the bottom end of each upper leg member;

(e) means, attached to each upper leg member, to fix the at least one lower leg member in a predetermined telescoping position with respect to the leg bottom; and at least one intermediate extension member adapted for connection to the base structure, the at least one intermediate leg extension member comprising two spaced, parallel legs connected by at least one step member, the intermediate leg extension member legs being adapted for telescoping connection in the first and second upper leg members when the lower leg members are removed.

The features, benefits and objects of this invention will become clear to those skilled in the art by reference to the following description, claims and drawings.

DESCRIPTION OF THE PREFERRED EMBODIMENTS

The trestle apparatus of the present invention is an portable, adjustable device for use in the construction and other trades. The trestle is particularly well suited for use by drywall hangers. The trestle is light weight. It may be collapsed for storage or transport, for example in a track bed or automobile trunk The height of the trestle is adjustable from approximately 26 inches to approximately 70 inches. It is preferred that the maximum trestle be below 72 inches. Additionally, various elements of the trestle are independently adjustable to enable the trestle to provide a flat, stable working surface even when set up on an uneven surface such as a stairwell or grade. Finally, the trestle has a top work surface which can be removed and easily replaced when it is worn out, or removed and substituted with a wooden plank connected to a second trestle or to scaffolding.

Figure 1:
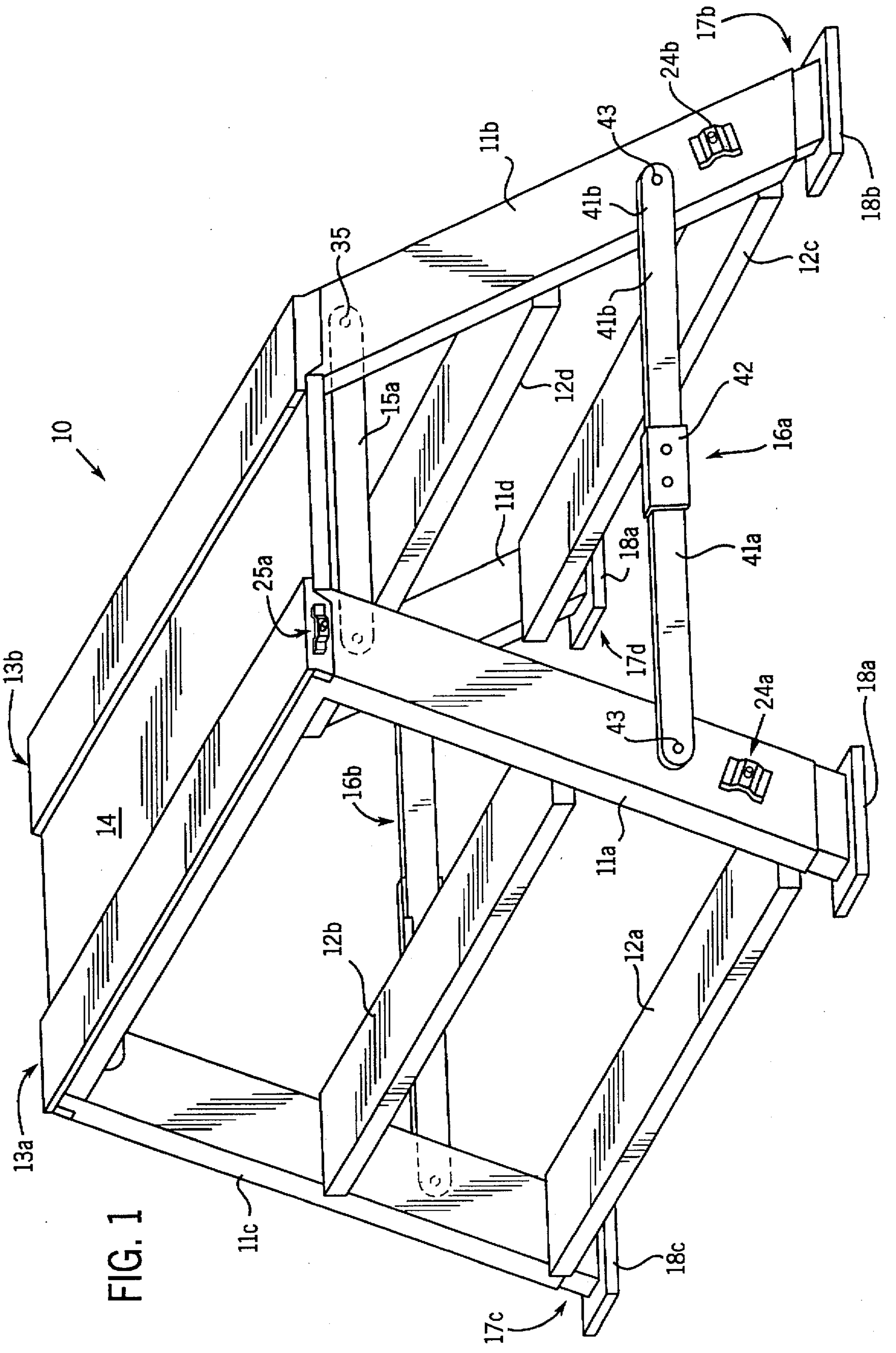
FIG. 1 is a perspective view of the lightweight, portable, adjustable trestle of the present invention.
Figure 2:
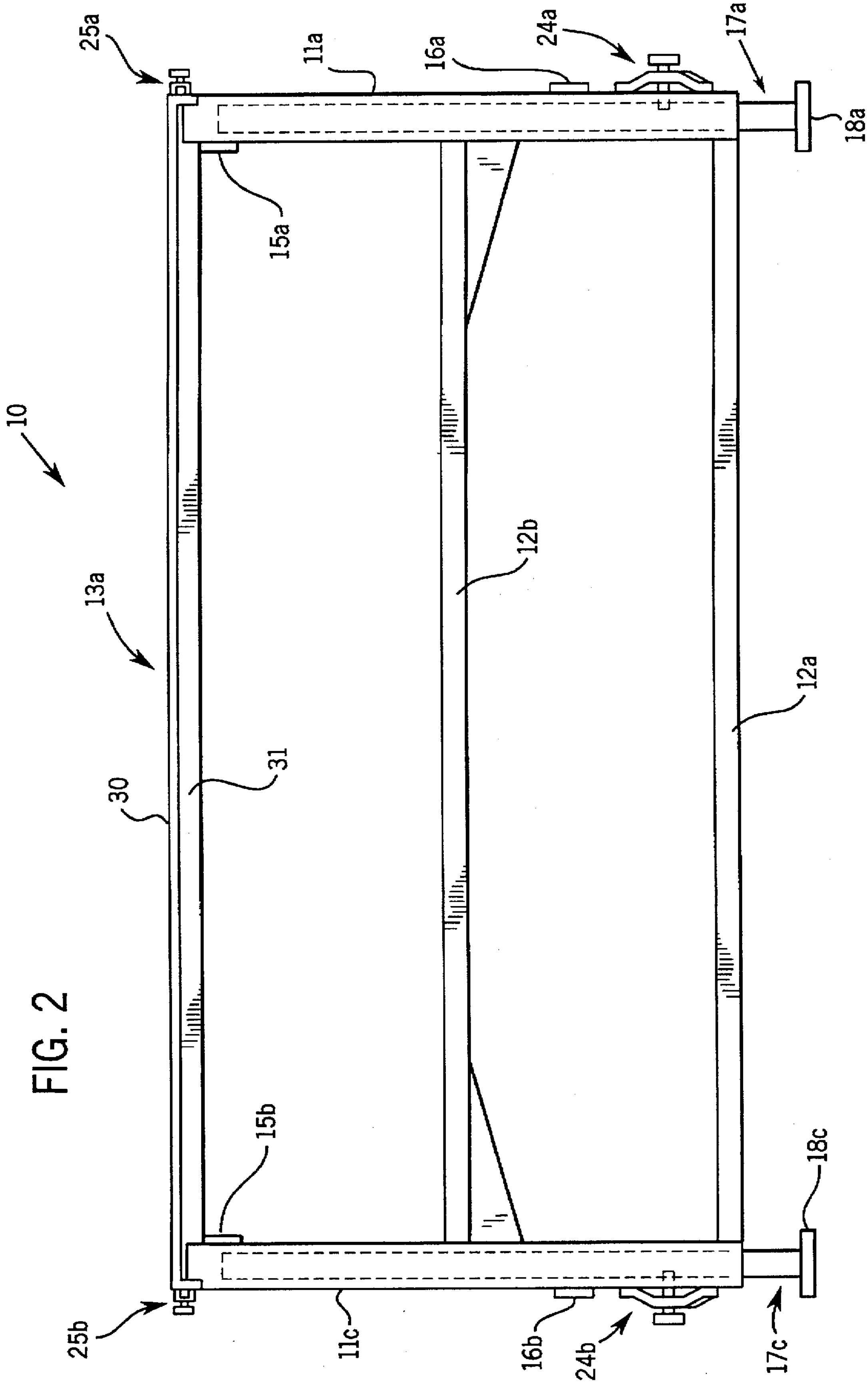
FIG. 2 is a side or elevation view of the trestle shown in FIG. 1.
Figure 3:
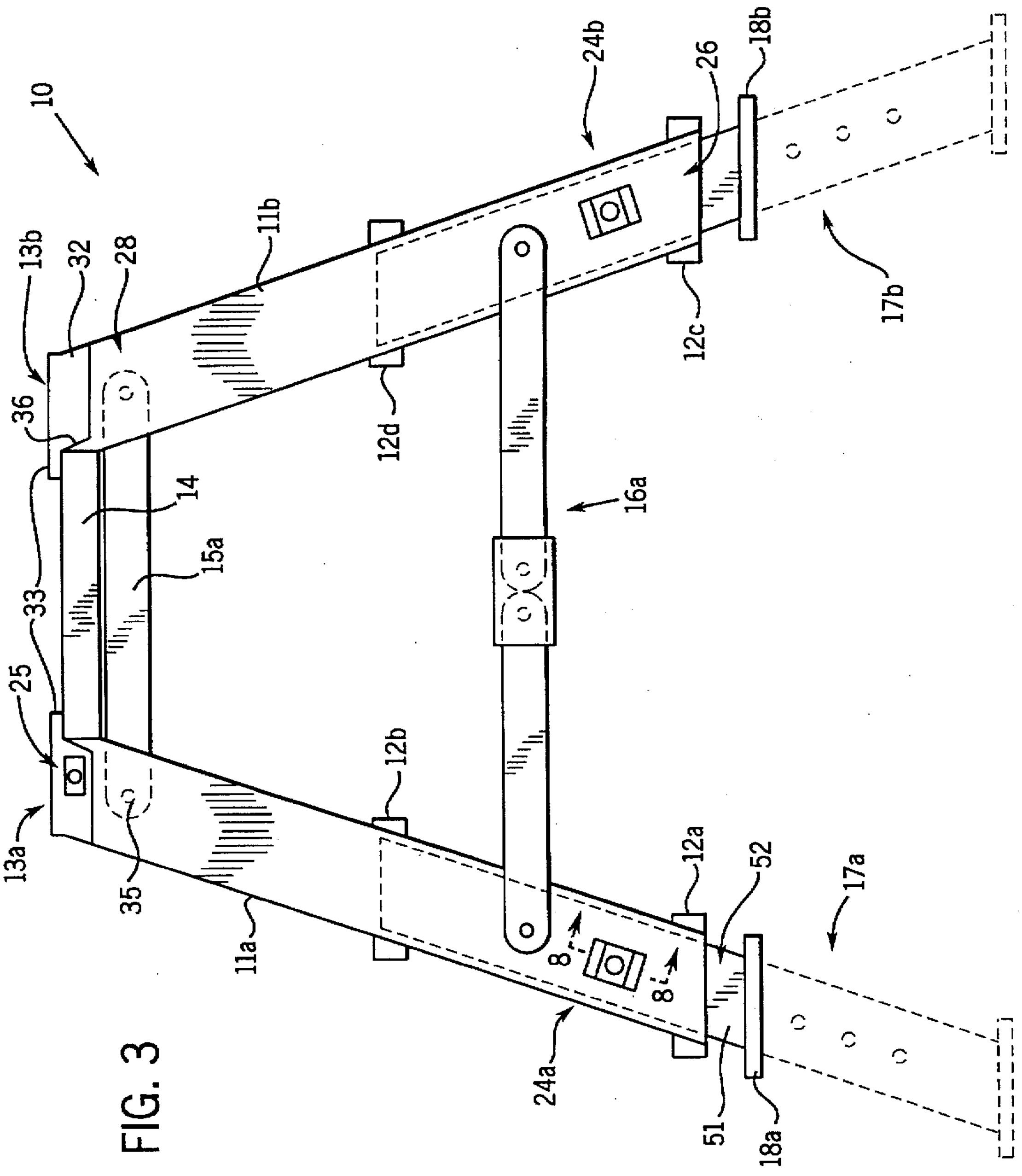
FIG. 3 is an end view of the trestle, partially in phantom, showing its adjustable legs.
Figure 6:
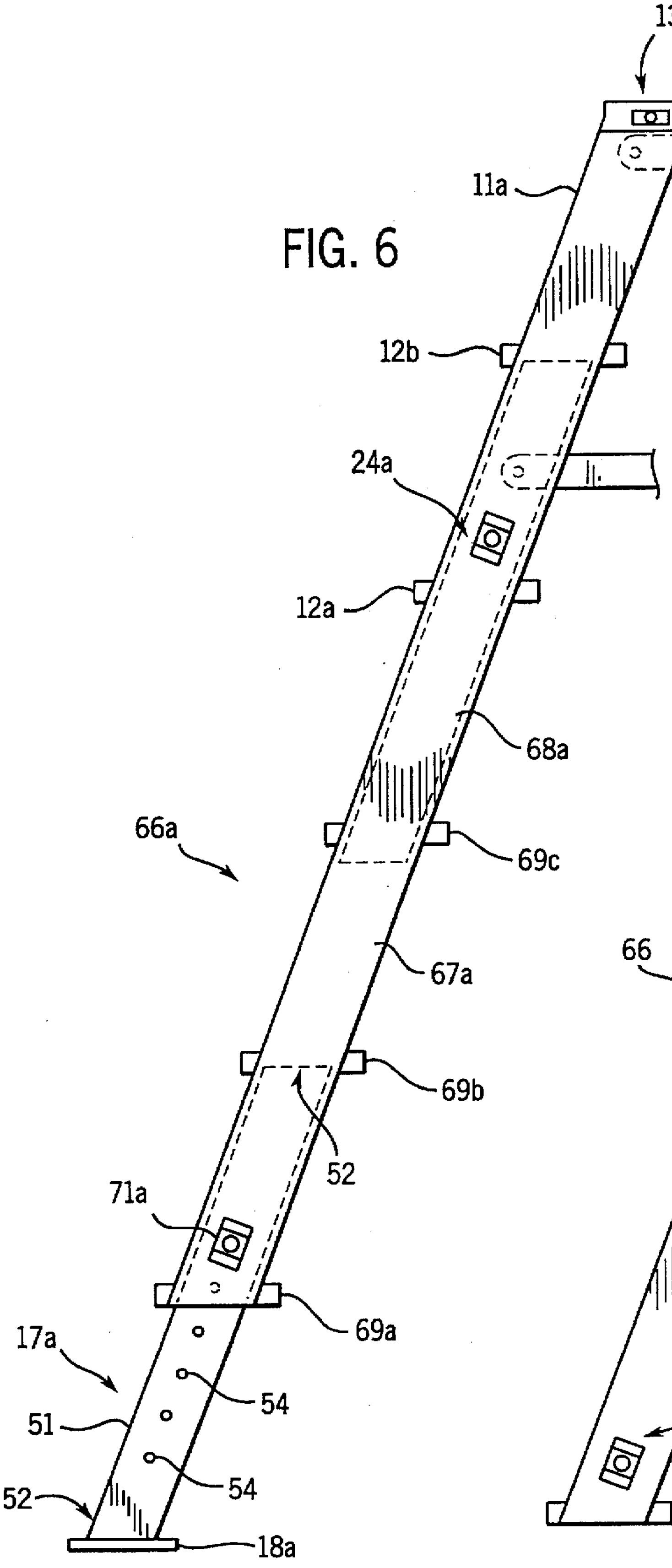
FIG. 6 is an end view of a portion of the trestle with an intermediate leg extension member connected thereto and fully extended, and with the adjustable lower leg member being positioned at the bottom of the intermediate leg extension member and fully extended, for maximum trestle height.

Referring to FIGS. 1–3, the trestle 10 of the present invention comprises a foldable base structure with an elongated ladder-type configuration. The base structure has a predetermined top surface height of preferably approximately 26 inches. The length of the trestle 10 is preferably between 24–48 inches, although the length may be varied for particular applications. The base structure includes four upper leg members 11*a–d* connected via step pads 12*a–d*, board locks 13*a* and *b*, board braces 15*a* and *b*, and folding locks 16*a* and *b*. A work surface such as a board member 14 is disposed at the top or apex region of the trestle 10 between the board locks 13*a* and *b*. Four lower leg member 17*a–d* are cooperatively and extensibly adjustably connected to the upper leg members 11*a–d*. The lower leg members 11*a–d* enable the user to level and/or increase the height of the work and support surfaces provide by the base structure of the trestle 10. In the embodiment shown, the lower leg members 11*a–d* permit increasing the height of the top or apex surface of the trestle 10 to approximately 36 inches in increments of 2 inches. At this height, the span or distance between the upper leg members 11*a* and 11*b* at one end of the trestle 10 is approximately 48 inches. The span distance of the trestle with fully retracted legs (minimum trestle height) is approximately 40 inches. In summary, the base structure provides three steps, including the step pads 12 and the top work surface 14, with an adjustable, levelable height range of from 26 to 36 inches.

As is best shown in FIG. 3, the upper leg member 11*a–d* are preferably 1½×3 rectangular metal, preferably aluminum, bars with hollow centers. The upper leg members have a bottom end 26 which is cut at approximately a 68 degree angle. The top end 28 is also angled at approximately 68 degrees and further has a notch on an inwardly disposed side to permit connection of related elements at the top of the trestle 10 as is described below. The upper leg members 11 have a preferred maximum length of approximately 26 inches for the embodiment shown.

The step pads 12 are preferably 1½×4×⅛ inch rectangular aluminum inverted channel or U-shaped structures. The outer top and side surfaces preferably have ridges, hurling or have some other rough surface to provide slip resistance. Alternatively, a separate slip resistant member may be applied thereto. The ends of the step pads 12 are connected to the inwardly disposed edge of the upper leg members 11 at predetermined positions. Connection is preferably made via a weld. A stabilizing grommet (not shown) may be used to strengthen the connection. A preferred length of the step pads 12 is 45 inches in the embodiment shown, although the length may be varied if a shorter trestle is desired.

Figure 10:
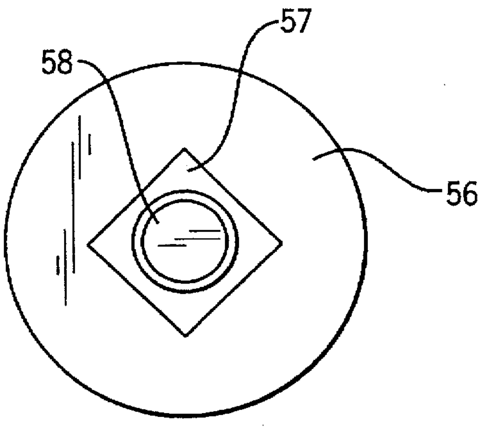
FIG. 10 is a bottom view of the connection element connection pin.
Figure 11:
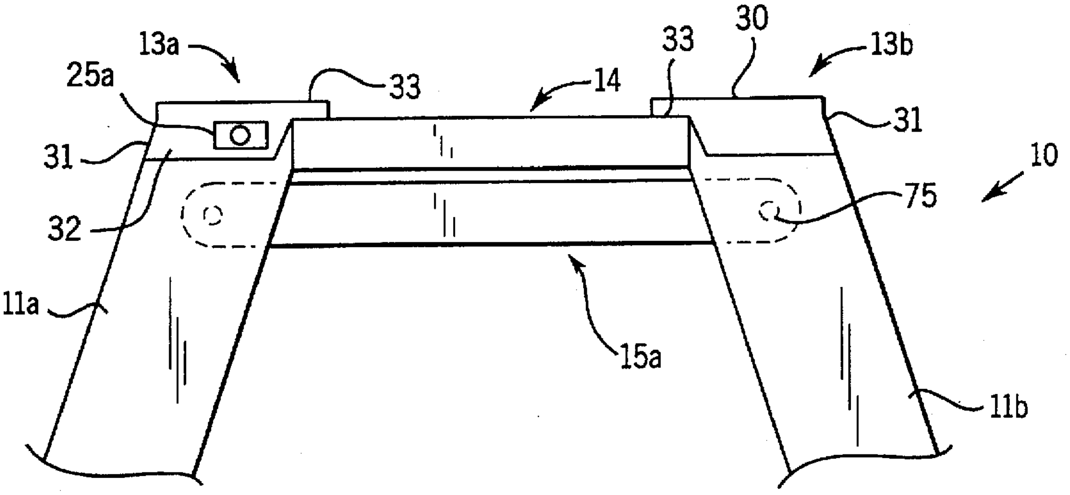
FIG. 11 is a detailed end view of the top of the trestle.
Figure 12:
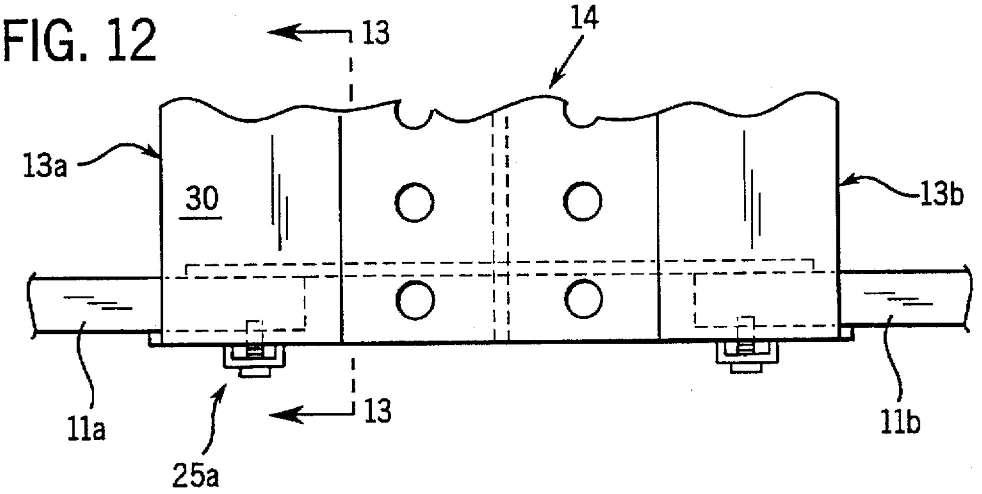
FIG. 12 is a detailed top view of an end portion of the trestle.
Figure 13:
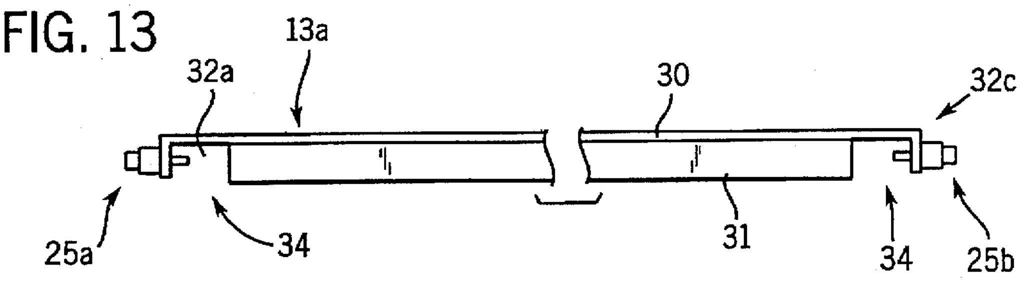
FIG. 13 is a side view of a portion of the trestle taken along line 13—13 of FIG. 12.

Referring also to FIGS. 11–13, the board locks 13*a* and *b* are elongated metal structures disposed parallel to one another, spaced a predetermined distance apart, at the top or apex area of the trestle 10. Lock 13*a* is pivotally connected to the top end of legs 11*a* and *c*. Lock 13*b* is fixedly connected to the top end of legs 11*b* and *d*. The pivotal connection of lock 13*a* to legs 11*a* and *c* are made via connectors 25*a* and *b*. Upon release of the connectors 25, the lock 13*a* pivots upwardly and outwardly (away from lock 13*b*). The board 14, which may be constructed of wood, metal or plastic, and may have predrilled holes, is disposed in the space between the locks 13. Lock 13*a* is moved down into its normal, closed position to firmly hold the board 14 in place between it and lock 13*b*. This structure permits removal or substitution of the board 14, for example from a metal structure to a wooden board for clamping, nailing or cutting of material thereon. Each lock 13*a* and *b* has a flat, elongated top portion 30 preferably approximately 4 and ½ inches wide, a side portion 31, preferably approximately 1 and ½ inches wide, disposed along the outward end of the top potion 30 at a right angle thereto, and a pair of end potions 32. Each top potion 30 has a predetermined width with an inwardly oriented lip or edge 33 which extends beyond the cap 32 to grasp the board 14. Each side potion 31 is coextensive with the length of the top potion 30 except at each end, where a notch 34 is provided to allow for connection with the top end of the upper leg members 11. Each end potion 32 has a generally rectangular configuration preferably approximately 2×3 and ½ inches, with one inwardly disposed angle end 36. The end potions 32 of stationary board lock 13*b* is affixed to upper leg members 11*b* and *d*. The end potions 32 of pivoting board lock 13*a* each preferably pivotally move about interior pin (not shown). These end portions 32 are locked in place by pin lock assemblies 25, the preferred design of which is discussed below in connection with FIGS. 8–10.

Referring again to FIGS. 1–3, the board braces 15*a* and *b* are straight rigid metal structures which are pivotally attached at each end to the interiorly facing sides of pairs of aligned legs 11. The board braces 16 are disposed a predetermined distance from the tops of the upper leg members 11 such that they support the bottoms of the ends of the board 14. The braces pivot about connectors 35 attached to the upper leg members 11.

The folding locks 16*a* and *b* each include a pair of bar members 41*a* and *b* and a retainer 42. Each bar member 41 is pivotally attached at its outward end to a side of a leg 11, approximately at the mid-point of the leg 11. The inwardly disposed end, and preferably the outwardly disposed end, of each bar member 41 has a predetermined radius. The retainer 42 is a rectilinear structure to which the abutting, linearly aligned inward ends of the bar members 41 of the folding lock 16 are pivotally connected. The retainer 42 has an open bottom which permits pivotal, downward movement of the bar members 41 with respect to one another, and folding of the trestle 10. When the bar members 41 are horizontally aligned, the lock 16 is engaged to stabilize the trestle 10.

With particular reference to FIG. 3, the lower leg members 17*a–d* each comprise a body member 51 and the base 18. The body members 51 are preferably 1¼×2½ inch rectangular metal, preferably aluminum, bars with hollow centers and are preferably approximately 24 inches long for the embodiment shown. The body members 51 have a bottom end 52 which is cut at approximately a 68 degree angle. The top end (not shown) is angled at approximately 68 degrees. The bases 18 are connected to the bottom ends 52. Connection apertures 54, preferably 6, are centrally and linearly disposed on the bottom half of the body member 51, spaced at approximately 2 inch intervals to yield an extension range of 10 inches. The bottom aperture 54 is spaced 4 inches from the bottom of the body member 51 for alignment with the connector 24*a* on upper leg member 11. In an operative orientation, the body members 51 are slidably disposed in the interior space of the upper leg members 11. To adjust the height of the trestle 10 or to level the trestle, one or more body members 51 is longitudinally moved with respect to the leg or upper leg member(s) 11.

Figure 8:
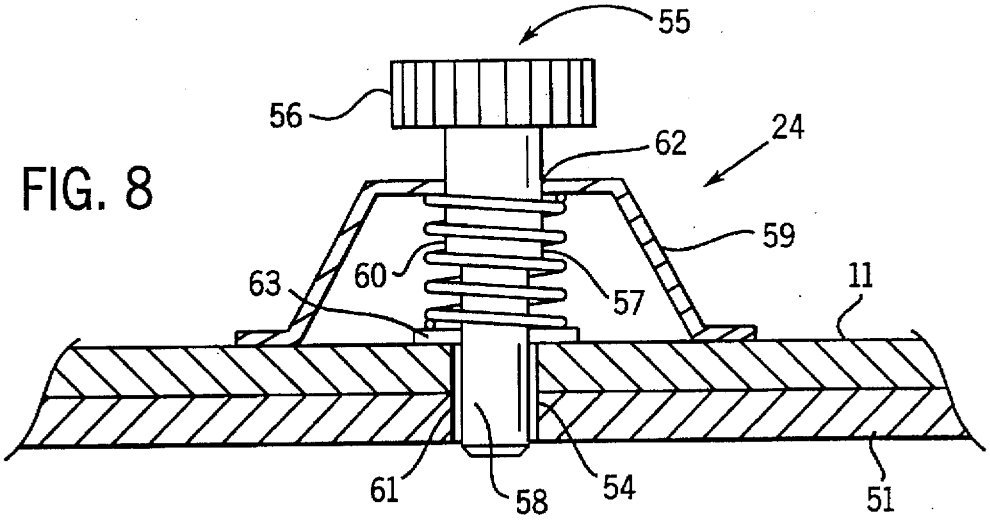
FIG. 8 is a view, partially in crossection along line 8—8, of the connection element shown in FIG. 3.
Figure 9:
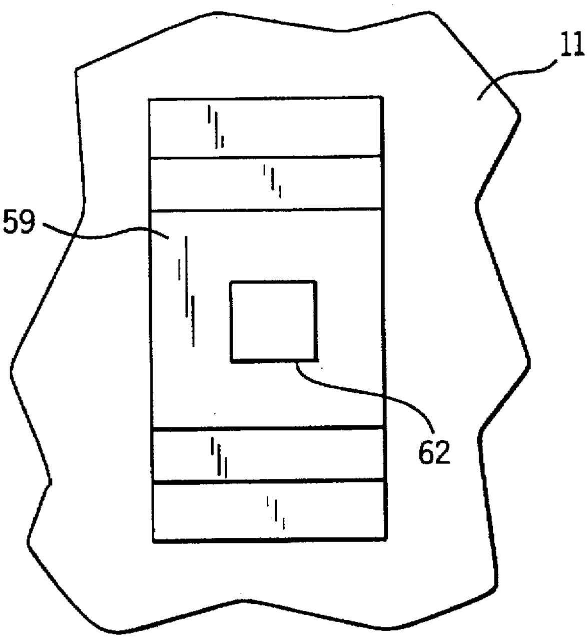
FIG. 9 is a top view of the connection element bracket with a connection pin removed.

Referring also to FIGS. 8–10, each body member 51 is locked in place by a pin lock assembly 24*a–d*, disposed approximately 4 inches from the bottom of upper leg member 11*a–d*, which mates with a connection aperture 54 on the member 51. Each pin lock assembly 24 preferably comprises a pin 55, a bracket 59, and a biasing spring 60. The pin 55 includes a round top head 56, a square first shaft segment 57 of a predetermined dimension, and a round second shaft segment 58 of a lesser dimension than that of segment 57. In a locking position, the pin 55 extends through square aperture 62 in the bracket 59, through an aligned aperture 61 in the upper leg member 11, and finally through the aligned aperture 54 in the extension body 51. The biasing spring 60 surrounds the pin 55, its bottom end (as viewed in FIG. 8) being disposed against spring retainer pin 63 laterally disposed through shaft 58 and its top end being retained by the bracket 59 interior. In this configuration, the biasing spring 60 urges the pin 55 downwardly to be normally seated in apertures 61 and 54, thereby locking the position of the upper leg member body 51 with respect to the leg 11. Spring retainer pin 63 also serves as a stop to limit the downward extension of the pin 55. The lock between the leg structures 11 and 51 is released by manually pulling back or up on the head 56 of the pin. The top end of the pin portion 57 has a square dimension equivalent to that of the bracket aperture 62, so that rotation of the pin 55 approximately ⅛ of a turn will hold it in a raised or retracted position, where the bottom of segment 58 is pulled from aperture 54, but preferably remains disposed in aperture 61 for stability.

Referring to FIGS. 4–7 the trestle 10 also preferably comprises a set of two optional intermediate leg extension member 66*a* and *b* (*b* not shown). The intermediate leg extension members are shown operatively connected to the trestle 10 in FIGS. 5–7, wherein low leg members 17 are removed from upper leg members 11, the second leg extension member(s) 66 is insertably connected to the bottom of the upper leg members 11, and the first leg extensions 17 are insertably connected to the bottom of the intermediate leg extension member(s) 66. As will become apparent from the discussion below, when added to the trestle 10 the base structure described above, the intermediate leg extension member(s) 66 extend the 3 step, 26 to 36 inch height range provided by the base structure, to 6 steps through a height range of 48–70 inches, and provide increased trestle adjustablity for use on stairs or sloped or uneven surfaces. Although only one intermediate leg extension member 66*a* is shown, for example in FIG. 5 for use on an uneven slope, two intermediate leg extension member 66 may be used simultaneously, one connected to each side of the trestle 10.

Figure 4:
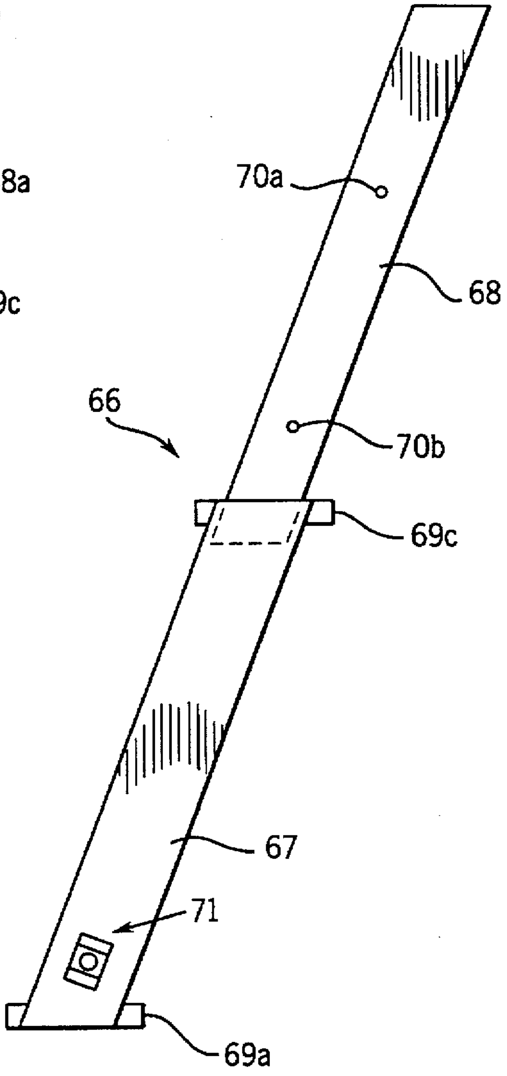
FIG. 4 is an end view of an intermediate leg extension member which may be connected to the trestle.
Figure 5:
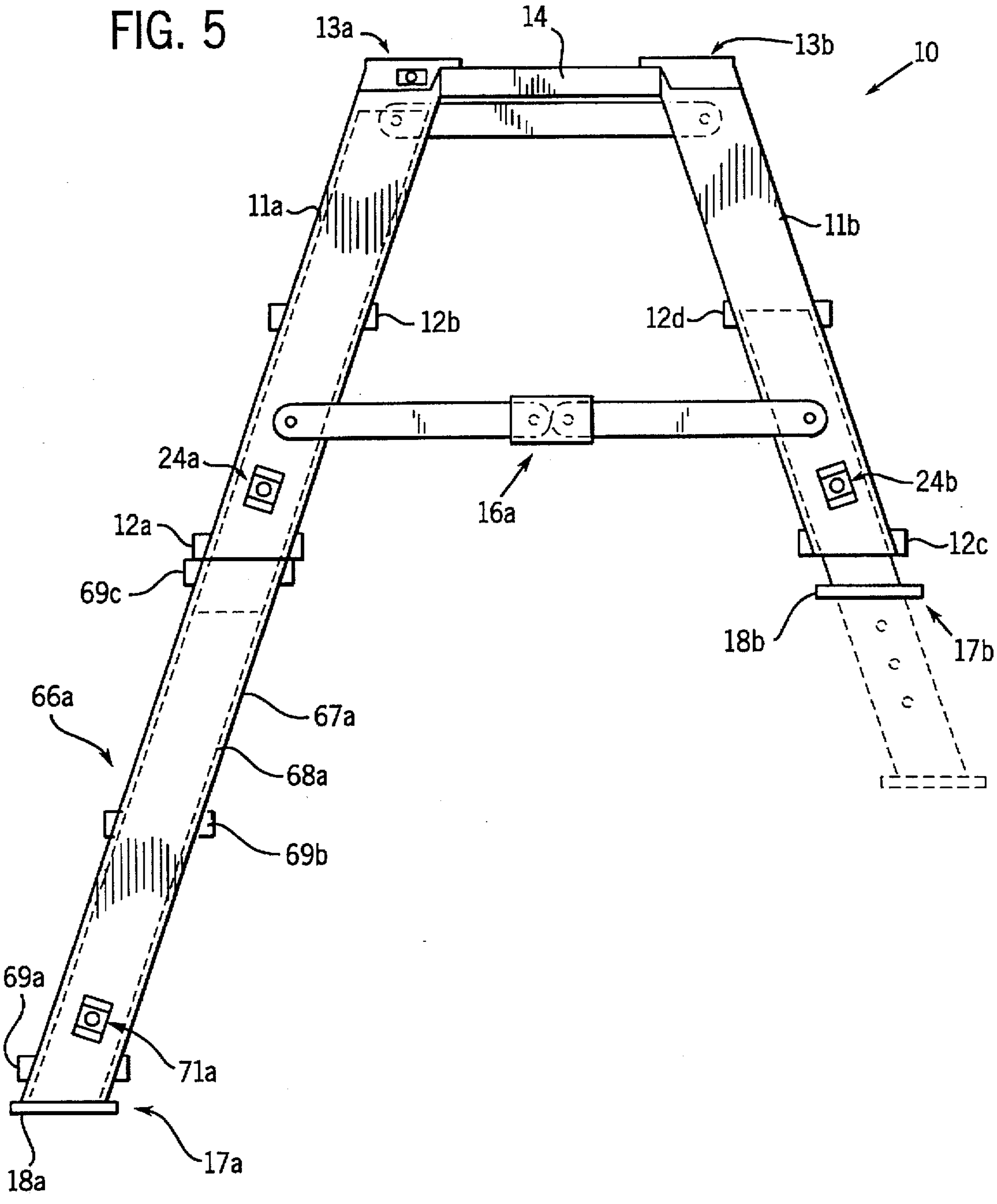
FIG. 5 is an end view of the trestle with a pair of lower leg members extended on one side whereby the trestle is useable on a grade or stairs.
Figure 7:
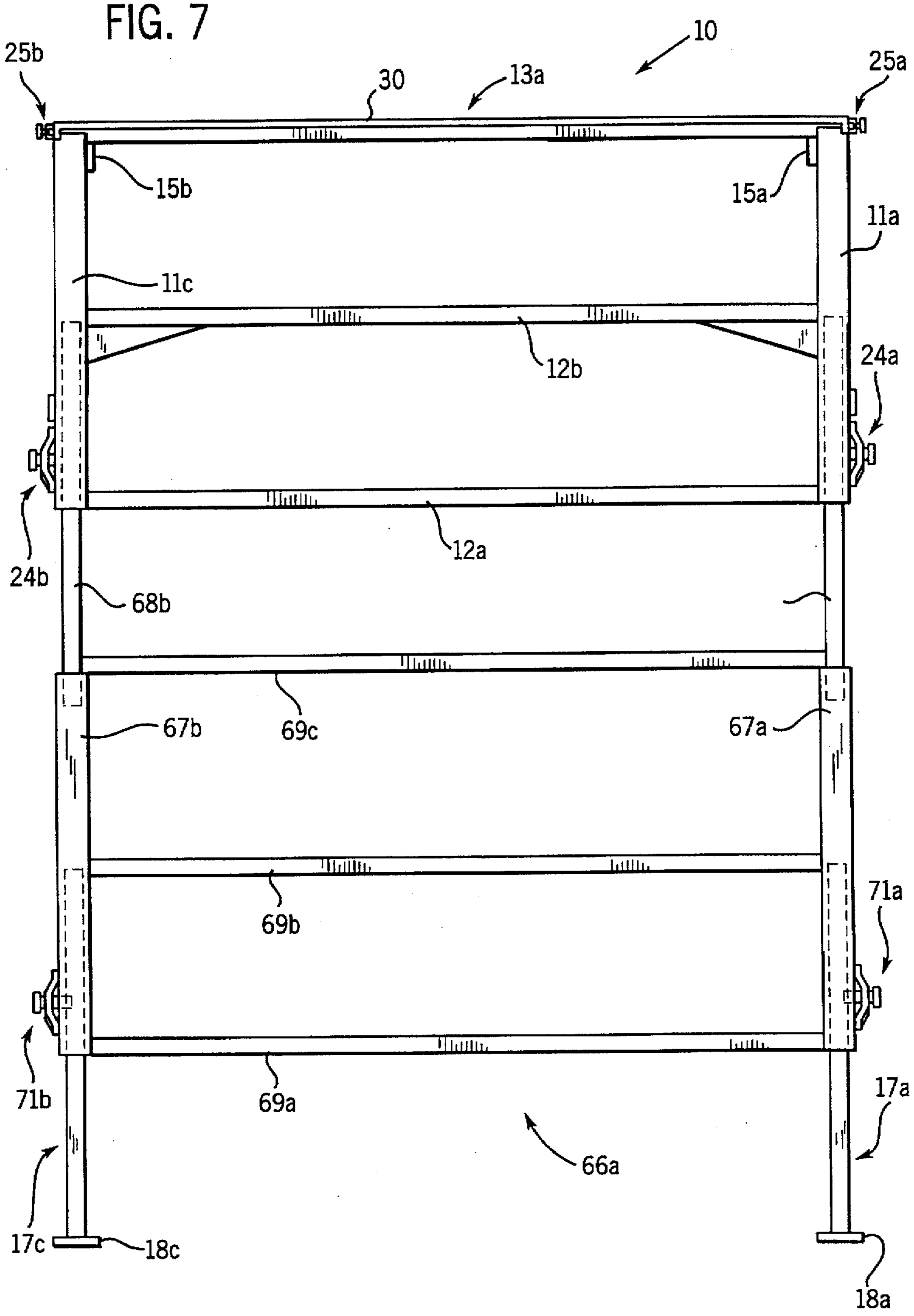
FIG. 7 is a side or elevation view of the entire trestle with intermediate leg extension members connected thereto and fully extended, and with the adjustable lower leg members being positioned at the bottom of the intermediate leg extension members and fully extended, for maximum trestle height.

Referring to FIGS. 4 and 7, each intermediate leg intermediate leg extension member 66 comprises a pair of bottom base portions 67*a* and *b*, and a pair of top connector portions 68*a* and *b*. Each base portions 67 is preferably a rectangular, tubular hollow metal structure with dimensions equivalent to those of the legs 11. Each connector portion 68 is a rectangular, tubular metal structure preferably approximately 26 inches long which is fixed to the top end of its respective base portion. The base portions 67*a* and *b* of each intermediate leg extension member 66 are connected via step pads 69*a–c*, for example by a welded connection. Each connector portion 68 has dimensions substantially equivalent to those of the lower leg member 17 and are slidably insertable in the upper leg members 11 when lower leg members 17 are removed from the upper leg members 11. Connector portions 68 each have a top and a bottom connection aperture 70*a* and *b*, respectively, which mate with a connector 24 to secure the position of the connector portion 68 in the upper leg member 11. Top aperture 70*a* is used for maximum trestle height and is preferably disposed 8 inches from the top of the connector portion 68 so that a minimum length of 12 inches of connector portion 68 is always insertably disposed in upper leg member 11 for stability and strength. The lower aperture 70*b* is preferably disposed approximately 12 inches below aperture 70*a* and is utilized for a lower trestle height. Pin connectors 71 are attached to the outside face of the base portions 67 near the bottom. The connectors 71 are used to adjust the extension length of the lower leg extension members 17, one or all of which may be inserted in the bottom of the base portions 67. The connectors 71 mate with apertures 54 in the leg extension members 17.

The descriptions above and the accompanying drawings should be interpreted in the illustrative and not the limited sense. While the invention has been disclosed in connection with the preferred embodiment or embodiments thereof, it should be understood that there may be other embodiments which fall within the spirit and scope of the invention as defined by the following claims. Where a claim is expressed as a means or step for performing a specified function it is intended that such claim be construed to cover the corresponding structure, material, or acts described in the specification and equivalents thereof, including both structural equivalents and equivalent structures.

The invention claimed is:

1. A platform apparatus comprising:

(a) a base structure having a top platform having a predetermined length and width and four legs connected to and extending downwardly from said platform, first said four legs included and second legs being disposed at opposing ends and extending downwardly and away from a first side of said platform at a predetermined angle, and third and fourth legs being disposed at opposing ends and extending downwardly and away from a second side of said platform at said predetermined angle, each said leg having a predetermined length with a top and a bottom end, and an interior cavity which is open at said bottom end;

(b) at least one leg extension member connected to and telescopingly disposed in the bottom end of each said leg; and (c) means to releasibly couple said top platform to said legs, said means comprising first and second parallel elongated clamp members spaced a predetermined distance apart, said first clamp member being pivotably connected to said first and second legs and said second clamp member being fixed to said third and fourth legs.

2. An adjustable trestle comprising:

a top platform structure and four upper leg members extending downward from the top platform structure a first said four upper legs members include upper leg member and a second upper leg member extending downward from the side of the platform structure at a predetermined angle, each upper leg member having a longitudinal interior cavity that is open on a bottom end of the upper leg member and a pin receiving aperture through a side of the upper leg member into the interior cavity, wherein at least one step spans generally horizontally between the first and second upper leg members;

four lower leg members each having a skid resistant base and a longitudinal body adapted to slide telescopingly within a corresponding interior cavity in one of the upper leg members, each lower leg member body having a series of pre-formed adjustment apertures spaced longitudinally along a lower portion of the body; and an adjustment pin for each leg that can be placed through the pin receiving aperture in the side of each upper leg member and selectively in one of the adjustment apertures of the longitudinal series of adjustment apertures along the lower portion of the respective lower leg member body to selectively adjust the distance from the base of the respective lower leg member to the top platform structure;

wherein each adjustment pin is part of a pin lock assembly comprising:

a bracket mounted to a respective upper leg member to cover the pin receiving aperture through the upper leg member into the internal cavity, the bracket having a raised surface containing a non-circular hole that is in alignment with the pin receiving aperture through the upper leg member;

an adjustment pin having a head, a first shaft segment having a non-circular cross-section that corresponds to the non-circular hole in the raised surface of the bracket, and a second shaft segment having a lesser diameter than the first shaft segment so that the second shaft segment can be selectively placed through the pin receiving aperture in the upper leg member and in one of the adjustment apertures spaced longitudinally along the respective lower leg member body;

a retainer pin positioned transversely through the second shaft segment; and a biasing spring surrounding the adjustment pin between the retainer pin and the raised surface of the bracket to urge at least a portion of the adjustment pin through the pin receiving aperture in the respective upper leg member and into one of the adjustment apertures of the series of adjustment apertures along the lower portion of the lower leg member body after the position of the lower leg member within the respective upper leg member has been properly selected.

3. An adjustable trestle as recited in claim 2 wherein the bracket contains a square hole and the first shaft segment of the adjustment pin has a square cross-section corresponding to the square hole.

4. An adjustable trestle comprising:

a top platform structure and four upper leg members extending downward from the top platform structure, a first upper leg member and a second upper leg member extending downward from the side of the platform structure at a predetermined angle, each upper leg member having a longitudinal interior cavity that is open on a bottom end of the upper leg member and a pin receiving aperture through a side of the upper leg member into the interior cavity, wherein at least one step spans generally horizontally between the first and second upper leg members;

four removable lower leg members each having a skid resistant base and a longitudinal body adapted to slide telescopingly within a corresponding interior cavity in one of the upper leg members, each lower leg member body having a series of pre-formed adjustment apertures spaced longitudinally along the longitudinal body;

an adjustment pin for each upper leg member that can be placed through the pin receiving aperture in the side of each upper leg member and selectively in one of the adjustment apertures of the longitudinal series of adjustment apertures along the respective lower leg member body to selectively adjust the distance from the base of the respective lower leg member to the top platform structure; and further comprising an intermediate leg extension member for the first upper leg member and the second upper leg member, the intermediate leg extension member including:

a first longitudinal body having a top portion adapted to slide telescopingly within the longitudinal internal cavity of the first upper leg member when the respective lower leg member is removed, the top portion having two pre-formed adjustment apertures spaced longitudinally along its side, wherein the adjustment pin for the first upper leg member can be placed through the pin receiving aperture in the first upper leg member and selectively in one of the adjustment apertures in the series of pre-formed adjustment apertures in the top portion of the first longitudinal body of the intermediate leg extension member, a longitudinal base portion having a longitudinal interior cavity that is open on a bottom end of the base portion and a pin receiving aperture through a side of the base portion into the interior cavity within the base portion, wherein the longitudinal body of a lower leg member having a skid resistant base can slide telescopingly within the interior cavity of the base portion of the first longitudinal body of the intermediate leg extension member, and an adjustment pin for the base portion of the first longitudinal body of the intermediate leg extension member that can be placed through the pin receiving aperture in the base portion and selectively in one of the adjustment apertures in the lower portion of the longitudinal body of the respective lower leg member having a skid resistant base; a second longitudinal body having a top portion adapted to slide telescopingly within the longitudinal internal cavity of the second upper leg member when the respective lower leg member is removed, the top portion having two pre-formed adjustment apertures spaced longitudinally along its side, wherein the adjustment pin for the second upper leg member can be placed through the pin receiving aperture in the second upper leg member and selectively in one of the adjustment apertures in the series of pre-formed adjustment apertures in the top portion of the second longitudinal body of the intermediate leg extension member, a longitudinal base portion having a longitudinal interior cavity that is open on a bottom end of the base portion and a pin receiving aperture through a side of the base portion into the interior cavity within the base portion, wherein the longitudinal body of a lower leg member having a skid resistant base can slide telescopingly within the interior cavity of the base portion of the second longitudinal body of the intermediate leg extension member, and an adjustment pin for the base member of the second longitudinal body of the intermediate leg extension member that can be placed through the pin receiving aperture in the base portion and selectively in one of the adjustment apertures in the lower portion of the longitudinal body of the respective lower leg member having a skid resistant base; and at least one step spanning between the longitudinal base portion of the first longitudinal body of the intermediate leg extension member and the base portion for the second longitudinal body of the intermediate leg extension member.

5. An adjustable trestle as recited in claim 4 wherein at least three steps span generally horizontally between the base portion for the first longitudinal body of the intermediate leg extension member and the base portion for the second longitudinal body of the intermediate leg extension member.

6. An adjustable trestle as recited in claim 4 wherein at least two steps span generally horizontally between the base portion of the first longitudinal body of the intermediate leg extension member and the base portion of the second longitudinal body of the intermediate leg extension member, and the lowest step is attached adjacent the bottom end of the base portion of the first longitudinal body and adjacent the bottom end of the base portion of the second longitudinal body, and the highest step on the intermediate leg extension member is attached adjacent the top end of the base portion of the first longitudinal body and adjacent the top end of the base portion of the second longitudinal body.

7. An adjustable trestle as recited in claim 4 wherein the two pre-formed adjustment apertures on the top portion of each longitudinal body on the intermediate leg extension member are spaced apart approximately 12 inches.

8. An adjustable trestle as recited in claim 4 wherein the four upper leg members include a third upper leg member and a fourth upper leg member that extend downward from the platform and the trestle further comprising a second intermediate leg extension member for the third upper leg member and the fourth upper leg member, the second intermediate leg extension member including:

a first longitudinal body having a top portion adapted to slide telescopingly within the longitudinal internal cavity of the third upper leg member when the respective lower leg member is removed, the top portion having two pre-formed adjustment apertures spaced longitudinally along its side, wherein the adjustment pin for the third upper leg member can be placed through the pin receiving aperture in the third upper leg member and selectively in one of the adjustment apertures in the series of pre-formed adjustment apertures in the top portion of the first longitudinal body of the second intermediate leg extension member, a longitudinal base portion having a longitudinal interior cavity that is open on a bottom end of the base portion and a pin receiving aperture through a side of the base portion into the interior cavity within the base portion, wherein the longitudinal body of a lower leg member having a skid resistant base can slide telescopingly within the interior cavity of the base portion of the first longitudinal body of the second intermediate leg extension member, and an adjustment pin for the base portion of the first longitudinal body of the second intermediate leg extension member that can be placed through the pin receiving aperture in the base portion and selectively in one of the adjustment apertures in the lower portion of the longitudinal body of the respective lower leg member having a skid resistant base; a second longitudinal body having a top portion adapted to slide telescopingiy within the longitudinal internal cavity of the fourth upper leg member when the respective lower leg member is removed, the top portion having two pre-formed adjustment apertures spaced longitudinally along its side, wherein the adjustment pin for the fourth upper leg member can be placed through the pin receiving aperture in the fourth upper leg member and selectively in one of the adjustment apertures in the series of pre-formed adjustment apertures in the top portion of the second longitudinal body of the second intermediate leg extension member, a longitudinal base portion having a longitudinal interior cavity that is open on a bottom end of the base portion and a pin receiving aperture through a side of the base portion into the interior cavity within the base portion, wherein the longitudinal body of a lower leg member having a skid resistant base can slide telescopingly within the interior cavity of the base portion of the second longitudinal body of the second intermediate leg extension member, and an adjustment pin for the base member of the second longitudinal body of the second intermediate leg extension member that can be placed through the pin receiving aperture in the base portion and selectively in one of the adjustment apertures in the lower portion of the longitudinal body of the respective lower leg member having a skid resistant base; and at least one step spanning between the longitudinal base portion of the first longitudinal body of the second intermediate leg extension member and the base portion for the second longitudinal body of the second intermediate leg extension member.

* * * * *

UNITED STATES PATENT AND TRADEMARK OFFICE

CERTIFICATE OF CORRECTION

PATENT NO. : 5,720,362

DATED : February 24, 1998

INVENTOR(S) : Jeff Denkins

It is certified that error appears in the above-identified patent and that said Letters Patent is hereby corrected as shown below:

CLAIM 1
Col. 6 Line 29

After "platform," cancel "first said four legs included" and substitute therefor --said four legs include first--.

CLAIM 2
Col. 6 Line 50

After "platform" cancel "structure a first said four upper leg members include" and substitute therefor ---structure, said four upper leg members include a first---

CLAIM 4
Col. 7 Line 43

"After "platform structure," cancel "structure a first said four upper leg members include" and substitute therefor --said four upper leg members include a first--.

UNITED STATES PATENT AND TRADEMARK OFFICE

CERTIFICATE OF CORRECTION

PATENT NO. : 5,720,362

DATED : February 24, 1998

INVENTOR(S) : Jeff Denkins

It is certified that error appears in the above-identified patent and that said Letters Patent is hereby corrected as shown below:

| | |
|---|---|
| CLAIM 4<br>Col. 8 Line 61 | After “base; and” insert a paragraph break |
| CLAIM 8<br>Col. 10 Line 11 | After “base; and” insert a paragraph break |
| CLAIM 8<br>Col. 10 Line 39 | After "base;" insert a paragraph break. |

Signed and Sealed this

Twenty-fourth Day of November, 1998

Attest:

BRUCE LEHMAN

*Attesting Officer*

*Commissioner of Patents and Trademarks*